(12) United States Patent
Zhang et al.

(10) Patent No.: US 12,429,925 B2
(45) Date of Patent: Sep. 30, 2025

(54) FOLDABLE ASSEMBLY OF ELECTRONIC DEVICE AND ELECTRONIC DEVICE

(71) Applicant: Honor Device Co., Ltd., Shenzhen (CN)

(72) Inventors: Yaolei Zhang, Shenzhen (CN); Mingqian Gao, Shenzhen (CN); Guotong Zhou, Shenzhen (CN); Haifei Li, Shenzhen (CN); Leibo Yuan, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/266,913

(22) PCT Filed: Sep. 7, 2022

(86) PCT No.: PCT/CN2022/117454
§ 371 (c)(1),
(2) Date: Jun. 13, 2023

(87) PCT Pub. No.: WO2023/040713
PCT Pub. Date: Mar. 23, 2023

(65) Prior Publication Data
US 2024/0053801 A1 Feb. 15, 2024

(30) Foreign Application Priority Data

Sep. 18, 2021 (CN) .......................... 202111100920.7

(51) Int. Cl.
*G06F 1/16* (2006.01)
*H04M 1/02* (2006.01)

(52) U.S. Cl.
CPC .......... *G06F 1/1681* (2013.01); *H04M 1/022* (2013.01); *H04M 1/0247* (2013.01);
(Continued)

(58) Field of Classification Search
CPC .... G06F 1/1616; G06F 1/1652; G06F 1/1681; H04M 1/022; H04M 1/0268
See application file for complete search history.

(56) References Cited

U.S. PATENT DOCUMENTS 10,423,196 B2 * 9/2019 Seo .................. G06F 1/1652
11,336,759 B2 * 5/2022 Liao .................. H04M 1/022
(Continued)

FOREIGN PATENT DOCUMENTS

| CN | 111698355 A | 9/2020 |
| CN | 113067924 A | 7/2021 |

(Continued)

*Primary Examiner* — Anthony Q Edwards
(74) *Attorney, Agent, or Firm* — Slater Matsil, LLP (57) ABSTRACT

Disclosed are a foldable assembly of an electronic device and an electronic device. The electronic device may be a terminal product that includes a foldable flexible display. Sliding parts are respectively disposed on two sides of a rotating shaft part, the sliding parts include an upper bracket and a lower bracket, and the upper bracket and the lower bracket can be enclosed to form an arc-shaped slide. A main swing arm is further disposed on the door plate, the door plate can rotate around the rotating shaft part and drive a fitting segment of the main swing arm to slide along the arc-shaped slide, and each upper bracket is an independent structure.

17 Claims, 6 Drawing Sheets (52) U.S. Cl.
CPC ......... *H04M 1/0268* (2013.01); *G06F 1/1616* (2013.01); *G06F 1/1652* (2013.01)

(56) References Cited

U.S. PATENT DOCUMENTS

| | | | | |
|---|---|---|---|---|
| 11,617,277 | B2 * | 3/2023 | Huang | F16C 11/04 |
| | | | | 361/807 |
| 11,733,739 | B2 * | 8/2023 | Park | G06F 1/1681 |
| | | | | 361/679.27 |
| 11,737,223 | B2 | 8/2023 | Lee | |
| 11,856,119 | B2 | 12/2023 | Shang | |
| 11,862,047 | B2 * | 1/2024 | Park | G09F 9/301 |
| 11,994,161 | B2 * | 5/2024 | Liu | H05K 5/0226 |
| 12,130,671 | B2 * | 10/2024 | Park | E05D 3/122 |
| 2014/0042293 | A1 * | 2/2014 | Mok | G06F 1/1679 |
| | | | | 248/682 |
| 2015/0241925 | A1 * | 8/2015 | Seo | G06F 1/1652 |
| | | | | 361/679.27 |
| 2015/0378397 | A1 | 12/2015 | Park et al. | |
| 2021/0034117 | A1 | 2/2021 | Torres et al. | |
| 2022/0217228 | A1 | 7/2022 | Hu et al. | |
| 2024/0007554 | A1 | 1/2024 | Cheng et al. | |
| 2024/0094785 | A1 * | 3/2024 | Cheng | G06F 1/1652 |
| 2024/0206093 | A1 * | 6/2024 | Liao | H05K 5/0226 |
| 2024/0338058 | A1 * | 10/2024 | Xu | H04M 1/022 |

FOREIGN PATENT DOCUMENTS

| | | |
|---|---|---|
| CN | 113286023 A | 8/2021 |
| CN | 113315860 A | 8/2021 |
| EP | 3723351 A2 | 10/2020 |
| EP | 4030740 A1 | 7/2022 |
| EP | 4311208 A1 | 1/2024 |
| WO | 2020147633 A1 | 7/2020 |
| WO | 2021083171 A1 | 5/2021 |

* cited by examiner

FOLDABLE ASSEMBLY OF ELECTRONIC DEVICE AND ELECTRONIC DEVICE

CROSS-REFERENCE TO RELATED APPLICATIONS

This application is a national stage of International Application No. PCT/CN2022/117454 filed on Sep. 7, 2022, which claims priority to Chinese Patent Application No. 202111100920.7 filed on Sep. 18, 2021. The disclosures of both of the aforementioned application are hereby incorporated by reference in their entireties.

TECHNICAL FIELD

This application relates to the field of electronic product technologies, and in particular, to a foldable assembly of an electronic device and an electronic device.

BACKGROUND

With development of a flexible display technology, a flexible display (that is, a flexible display screen) is increasingly applied to an electronic device. In the electronic device, the flexible display and a foldable assembly are generally combined to implement folding and unfolding of the flexible display by using the foldable assembly, so as to form a foldable display of the electronic device.

The foldable assembly includes a rotating shaft part and two door plates, where the two door plates are respectively located on two sides of the rotating shaft part and may rotate around the rotating shaft part, and the two door plates are respectively configured to install the flexible display, and drive the flexible display to fold and unfold.

The rotating shaft part is provided with a sliding part, the sliding part includes an upper bracket and a lower bracket, and the upper bracket and the lower bracket can be enclosed to form an arc-shaped slide. A main swing arm is disposed on the door plate, the main swing arm includes a fitting segment, and the fitting segment is located in the arc-shaped slide and can snugly slide along the arc-shaped slide. When the door plate rotates around the rotating shaft part, the fitting segment can slide along the arc-shaped slide. To ensure smooth sliding of the main swing arm along the arc-shaped slide, there is a relatively high requirement on accuracy of fitting dimensions of the arc-shaped slide and the fitting segment.

In the conventional technology, after the upper bracket and the lower bracket are installed and fastened by using bolts, two arc-shaped slides that are respectively located on two sides of the rotating shaft part can be formed between the upper bracket and the lower bracket. In an assembly process, the upper bracket needs to take into account accuracy of both left and right arc-shaped slides, and requirements on accuracy of processing and installation dimensions of the upper bracket are relatively high. In addition, after installation, a case in which one arc-shaped slide is qualified, the other arc-shaped slide is unqualified, and then a plurality of adjustments need to be performed, and installation efficiency is relatively low.

SUMMARY

Embodiments of this application provide a foldable assembly of an electronic device and an electronic device, so as to resolve problems of low assembly efficiency of a sliding part and an inaccurate dimension of an arc-shaped slide.

A first aspect of embodiments of this application provides a foldable assembly of an electronic device, including a rotating shaft part and two door plates, where the two door plates are respectively configured to be fastened to a flexible display of the electronic device, and door plates can rotate around the rotating shaft part and drive the flexible display to fold and unfold. Two sides of the rotating shaft part are respectively provided with sliding parts, where the sliding parts each include an upper bracket and a lower bracket, the upper bracket can be fastened to the lower bracket, the upper bracket and the lower bracket can be enclosed to form an arc-shaped slide, an axis of the arc-shaped slide is parallel to a length direction of the rotating shaft part, and each upper bracket is an independent structure. The door plate is further provided with a main swing arm, the main swing arm is provided with a fitting segment that matches the arc-shaped slide, and the door plate can rotate around the rotating shaft part and drive the fitting segment to slide along the arc-shaped slide.

During assembly of a sliding part, the fitting segment is first placed on an arc-shaped surface of the lower bracket, then the upper bracket is placed on top of the lower bracket, and the arc-shaped surface of the upper bracket is bonded to top of the fitting segment. After a position is adjusted, the upper bracket and the lower bracket are fastened, that is, during installation, each upper bracket is separately installed and adjusted. Specifically, during installation, it is not necessary to consider installation adjustment of other upper brackets, provided that accuracy of dimensions of the arc-shaped slide formed between the upper bracket that is being installed and the lower bracket meets requirements. Therefore, compared with a solution in which two upper brackets are disposed as an integrated structure and are assembled at the same time, this can ensure installation accuracy of each arc-shaped slide, and can effectively reduce adjustment time and improve installation efficiency.

Based on the first aspect, an embodiment of this application further provides a first implementation of the first aspect.

A sliding part includes a bracket holder of an integrated structure, the bracket holder is fastened to the rotating shaft part, and lower brackets are respectively formed on two sides of the rotating shaft part. When two lower brackets correspondingly disposed on the two sides of the rotating shaft part are disposed as an integrated structure, an overall structure can be simplified, and an installation operation can be simplified.

Based on the first implementation of the first aspect, an embodiment of this application further provides a second implementation of the first aspect.

A groove structure is further disposed on an upper end face of the rotating shaft part, and the groove structure penetrates through the bracket holder. The foldable assembly further includes a floating plate, the floating plate is disposed between the two door plates, and is floatably disposed above the rotating shaft part. In a folded state, the floating plate can float downward until the floating plate is at least partially located in the groove structure. The floating plate can provide support for the flexible display from a position between the two door plates. In a folded state, the floating plate is at least partially located in the groove structure. Disposing the groove structure can reduce a thickness of the foldable assembly at the rotating shaft part, and then reduce a protrusion size of the rotating shaft part after the electronic device is folded, so that when a size of a flexible display is given, an overall size after the electronic device is folded can be reduced.

Based on the second implementation of the first aspect, an embodiment of this application further provides a third implementation of the first aspect.

The arc-shaped slide communicates with the groove structure, and an end of the fitting segment is provided with a support structure. The fitting segment can slide along the arc-shaped slide until the support structure protrudes from the arc-shaped slide and enters the groove structure. The support structure can be supported on a lower end face of the floating plate, and in an unfolded state, the support structure can push the floating plate up to an upper end face of the floating plate to align with an upper end face of the door plate. During unfolding, when the door plate rotates, a support structure of the end of the fitting segment acts on the floating plate, so that the floating plate floats upward relative to the rotating shaft part, and performance is stable.

Based on the third implementation of the first aspect, an embodiment of this application further provides a fourth implementation of the first aspect.

A spring is further disposed in the groove structure, and the spring can act on the floating plate, so that the floating plate floats downward relative to the rotating shaft part into the groove structure. The floating plate floats upward relative to the rotating shaft part when being driven by acting force of the spring, and performance is stable.

Based on any one of the first aspect, or the first to the fourth implementations of the first aspect, an embodiment of this application further provides a fifth implementation of the first aspect.

The main swing arm further includes a connection segment, where one end of the connection segment is connected to the fitting segment, and the other end of the connection segment is connected to the door plate. An upper end of the lower bracket is also provided with a limiting groove. In an unfolded state, the connection segment is located in the limiting groove and abuts against a bottom of the limiting groove. Disposing the limiting groove can avoid interference between the lower bracket and the connection segment in an unfolded state, so as to ensure that the door plate reaches an unfolded state. In addition, the bottom of the limiting groove can further limit sliding of the fitting segment in the arc-shaped slide. When the door plate drives a main swing arm to rotate, the fitting segment slides along the arc-shaped slide until the connection segment abuts against the bottom of the limiting groove, and it indicates that the fitting segment has slid in place, and an upper end face of the door plate aligns with the upper end face of the floating plate.

Based on any one of the first aspect, or the first to the fifth implementations of the first aspect, an embodiment of this application further provides a sixth implementation of the first aspect.

The upper bracket and the lower bracket are fastened through welding. In this way, a quantity of components and parts can be reduced and operation can be simplified.

Based on any one of the first aspect, or the first to the sixth implementations of the first aspect, an embodiment of this application further provides a seventh implementation of the first aspect.

The upper bracket is provided with a positioning hole, the lower bracket is provided with a positioning protrusion, and the positioning protrusion can be inserted into the positioning hole to position the upper bracket and the lower bracket. Alternatively, the upper bracket is provided with a positioning protrusion, the lower bracket is provided with a positioning hole, and the positioning protrusion can be inserted into the positioning hole to position the upper bracket and the lower bracket. During installation, an operator can quickly determine an installation position of the upper bracket, which can improve installation efficiency.

Based on the seventh implementation of the first aspect, an embodiment of this application further provides an eighth implementation of the first aspect.

The positioning hole is a through hole. In this way, during installation, it is convenient to observe fitting between the positioning protrusion and the positioning hole, so as to improve the installation efficiency.

Based on the eighth implementation of the first aspect, an embodiment of this application further provides a ninth implementation of the first aspect.

An end of the positioning protrusion and an end of the positioning hole are fastened through welding in a circumferential direction. In this way, stability of fastening between the upper bracket and the lower bracket is further ensured.

A second aspect of embodiments of this application provides an electronic device, including a flexible display and the foldable assembly according to any one of the first aspect, the first to the ninth implementations of the first aspect.

Technical effects of the electronic device are similar to those of the foldable assembly of the electronic device provided in the first aspect. To save space, details are not described herein again.

BRIEF DESCRIPTION OF THE DRAWINGS

To describe technical solutions in embodiments of this application or in the conventional technology more clearly, the following briefly describes accompanying drawings required for describing embodiments or the conventional technology. Apparently, the accompanying drawings in the following description show some embodiments of the present invention, and a person of ordinary skill in the art may still derive other drawings from these accompanying drawings without creative efforts.

Reference numerals in FIG. 1 to FIG. 12 are described as follows:

100—Foldable assembly; 200—Flexible display; 300—Housing;

1—Rotating shaft part, 11—Groove structure, 12—Sliding part, 13—Upper bracket, 14—Lower bracket, 141—Limiting groove, 15—Arc-shaped slide, 16—Arc-shaped surface, 17—Positioning protrusion, and 18—Welding area;

2—Floating plate;

3—Door plate;

4—Main swing arm, 41—Fitting segment, 42—Connection segment, 43—Support structure, 44—Support protrusion.

DETAILED DESCRIPTION OF ILLUSTRATIVE EMBODIMENTS

To enable a person skilled in the art to better understand technical solutions of this application, the following further describes this application in detail with reference to accompanying drawings and specific embodiments.

Embodiments of this application provide a foldable assembly of an electronic device and an electronic device, where the electronic device may be a terminal product including a foldable flexible display, such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in embodiments of this application.

Figure 1:
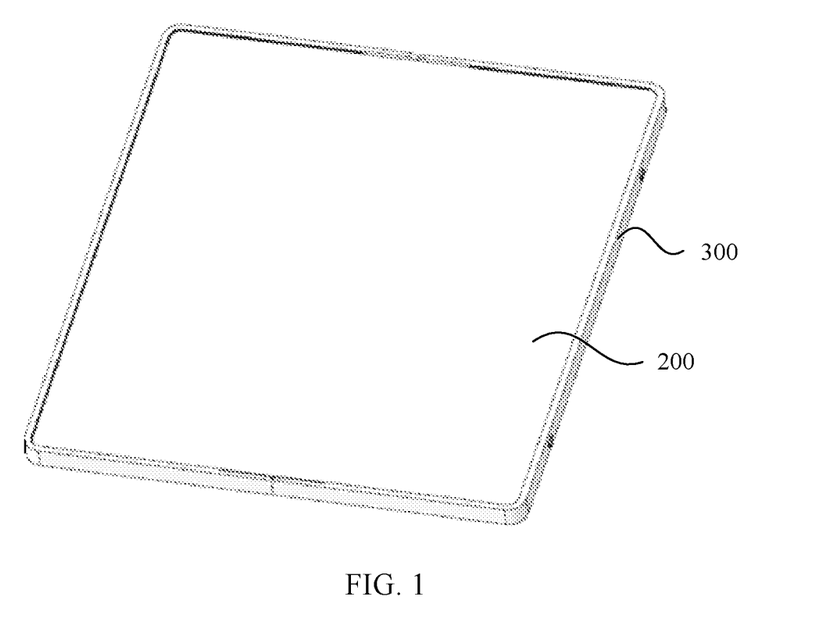
FIG. 1 is a schematic diagram of a structure of an electronic device in an unfolded state according to an embodiment of this application.
Figure 2:
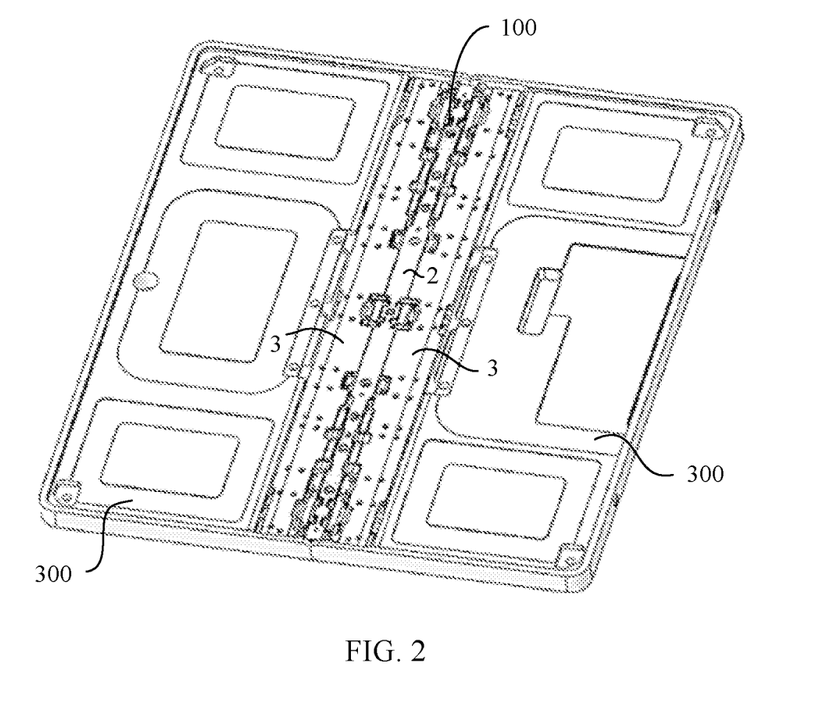
FIG. 2 is a schematic diagram of a structure of an electronic device in an unfolded state after a screen is removed.

As shown in FIG. 1 and FIG. 2, the electronic device includes a flexible display 200, a foldable assembly 100, and a housing 300. The foldable assembly 100 is approximately located in a middle position of the housing 300, and divides the housing 300 into two parts. The two parts may be an integrated structure, or may be a structure with two mutually independent parts that are divided by the foldable assembly 100.

Figure 3:
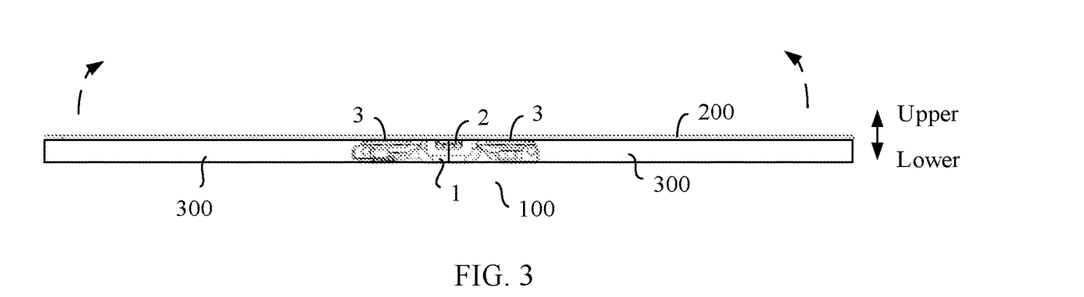
FIG. 3 is a front view of an electronic device in an unfolded state, where transparent processing is performed on a housing.

As shown in FIG. 3, the foldable assembly 100 includes a rotating shaft part 1 and two door plates 3. The two door plates 3 are respectively located on two sides of the rotating shaft part 1, the door plates 3 can rotate around the rotating shaft part 1, and the two door plates 3 are respectively correspondingly connected and fastened to two parts of the housing 300. In this way, the housing 300 forms a structure that can rotate around the rotating shaft part 1 and implement folding and unfolding. In this embodiment, the two door plates 3 can rotate around the rotating shaft part 1. Specifically, rotation axes of the two door plates 3 are parallel or collinear, and are parallel to a length direction of the rotating shaft part 1.

The flexible display 200 is fastened to an upper end face of the housing 300. In addition, a middle position of the flexible display 200 is further fastened to an upper end face of a door plate 3. As shown in FIG. 3, "upper" means a side facing a user when the electronic device is in use, that is, a side that is of the flexible display 200 and that faces the user when the electronic device is in use. In an unfolded state, as shown in FIG. 3, the upper end face of the door plate 3 aligns with the upper end face of the housing 300, so that the flexible display 200 can be flat in the unfolded state.

Specifically, during use, if the user needs to fold the electronic device in an unfolded state, the housing 300 may be manually operated, so that the two parts of the housing 300 are respectively bent upward in a direction indicated by a dotted arrow in FIG. 3. Specifically, two hands may respectively act on the two parts of the housing 300, so that the housing 300 is bent toward a side on which the flexible display 200 is disposed. In this case, the two parts of the housing 300 can rotate around the rotating shaft part 1 by respectively using the door plates 3, thereby implementing folding. Similarly, when an electronic device in a folded state needs to be unfolded, the housing 300 may be manually operated, so that the two parts of the housing 300 respectively moves to two sides along a direction indicated by a dotted arrow shown in FIG. 4. In this case, the two parts of the housing 300 can rotate to two sides around the rotating shaft part 1 by respectively using the door plates 3, thereby implementing unfolding.

Figure 4:
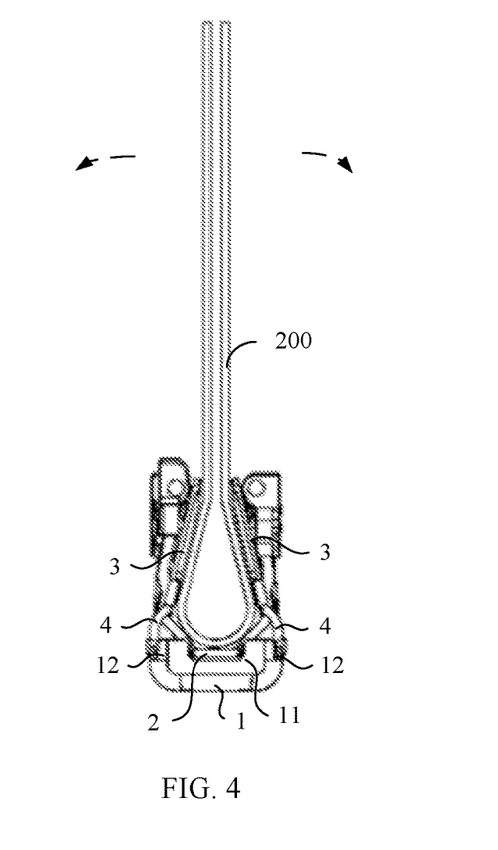
FIG. 4 is a schematic diagram of a structure of an electronic device in a folded state after a housing is removed.

As shown in FIG. 3 and FIG. 4, the foldable assembly 100 further includes a floating plate 2, and the floating plate 2 is disposed between the two door plates 3. A length direction of the floating plate 2, a length direction of the rotating shaft part 1, and a rotation axis of the door plate 3 are parallel to one another. The floating plate 2 can provide support for the flexible display 200 from a position between the two door plates 3. A groove structure 11 is disposed on an upper end face of the rotating shaft part 1 along the length direction of the rotating shaft part 1, and the floating plate 2 is disposed above the groove structure 11. The floating plate 2 can float up and down relative to the rotating shaft part 1. Specifically, during folding, the floating plate 2 can float downward relative to the rotating shaft part 1, the flexible display 200 folds along with the door plate 3, and the middle position of the flexible display 200 floats downward along with the floating plate 2. When a folded state is reached, the floating plate 2 is at least partially located in the groove structure 11, which may specifically be that a part of the floating plate 2 is located in the groove structure 11, or may be that all floating plate 2 enters the groove structure 11. In this case, a folded flexible display 200 forms a waterdrop-shaped structure between the door plate 3 and the floating plate 2 as shown in FIG. 4. The floating plate 2 can provide protection for the flexible display 200 in a folded state to prevent a fracture at the middle position of the flexible display 200 due to an excessively large bending angle. During unfolding, the flexible display 200 unfolds along with the door plate 3, the floating plate 2 can float upward relative to the rotating shaft part 1, and in an unfolded state, an upper end face of the floating plate 2 and the upper end face of the door plate 3 are aligned, so that the flexible display 200 is provided with a flat support surface, and the flexible display 200 can be spread and unfolded as shown in FIG. 3.

Figure 5:
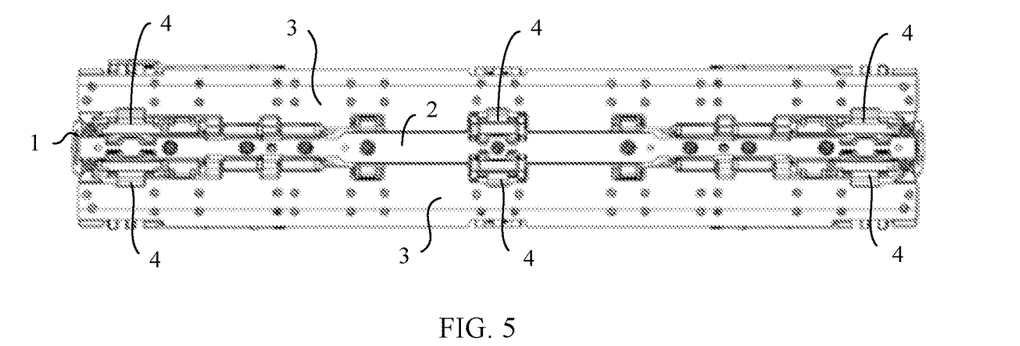
FIG. 5 is a top view of a foldable assembly in an unfolded state.
Figure 6:
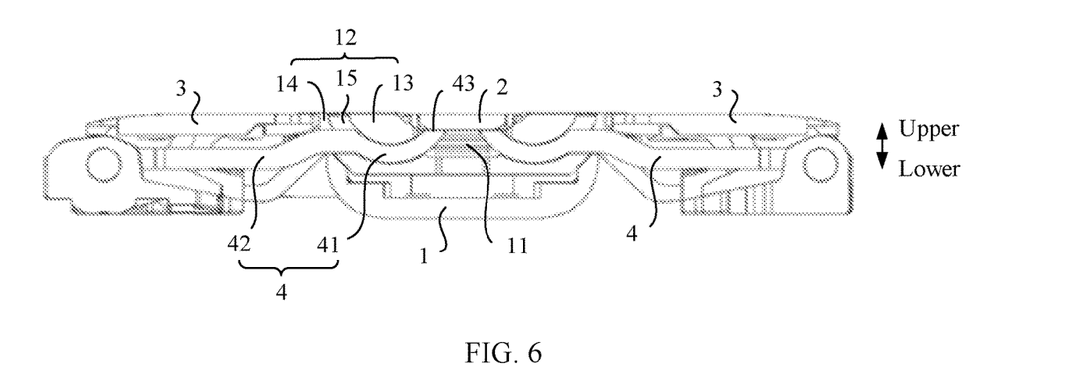
FIG. 6 is a sectional view of FIG. 5.

Specifically, two sides of the rotating shaft part 1 are respectively provided with sliding parts 12. As shown in FIG. 5 and FIG. 6, the sliding parts 12 includes an upper bracket 13 and a lower bracket 14, the upper bracket 13 can be fastened to the lower bracket 14, and the upper bracket 13 and the lower bracket 14 can be enclosed to form an arc-shaped slide 15. The door plate 3 is further provided with a main swing arm 4, and the main swing arm 4 is provided with a fitting segment 41. It is easy to understand that the upper bracket 13 is located above the lower bracket 14, and a lower end face of the upper bracket 13 and an upper end face of the lower bracket 14 are respectively provided with arc-shaped surfaces 16. After the upper bracket 13 and the lower bracket 14 are fastened, the arc-shaped surfaces 16 of the upper bracket 13 and the lower bracket 14 can be enclosed to form the arc-shaped slide 15. The fitting segment 41 is located in the arc-shaped slide 15 and may slide along the arc-shaped slide 15, so as to implement rotation of the door plate 3 around the rotating shaft part 1. A rotation axis of the door plate 3 is collinear with an axis of the arc-shaped slide 15 and an axis of the fitting segment 41.

Each side of the rotating shaft part 1 is provided with at least one sliding part 12. If there is only one sliding part 12, a width of the arc-shaped slide 15 may be set to be relatively great, and a contact area between the fitting segment 41 and the arc-shaped slide 15 may be increased, so as to ensure rotation stability of the door plate 3. Preferably, each side of the rotating shaft part 1 is provided with at least two sliding parts 12, and the sliding parts 12 are spaced along a length direction of the rotating shaft part 1 to ensure the rotation stability of the door plate 3. In this embodiment, a specific quantity, a specific size, and a specific position of the sliding part 12 and the main swing arm 4 are not limited. A specific quantity may be set based on a length of the door plate 3 or the like, provided that the two door plates 3 can stably rotate around the rotating shaft part 1 through slide fitting between the fitting segment 41 of the main swing arm 4 and the arc-shaped slide 15.

In an example in which an electronic device is a mobile phone, three groups of sliding parts 12 are respectively disposed on two sides of the rotating shaft part 1, and three main swing arms 4 may be disposed on the door plate 3. As shown in FIG. 5, two main swing arms 4 are respectively located on two ends of the door plate 3 in a length direction, one main swing arm 4 is located in a middle position of the door plate 3, and a position of the sliding part 12 is corresponding to a position of the main swing arm 4, so that stable rotation of the door plate 3 can be ensured.

Figure 7:
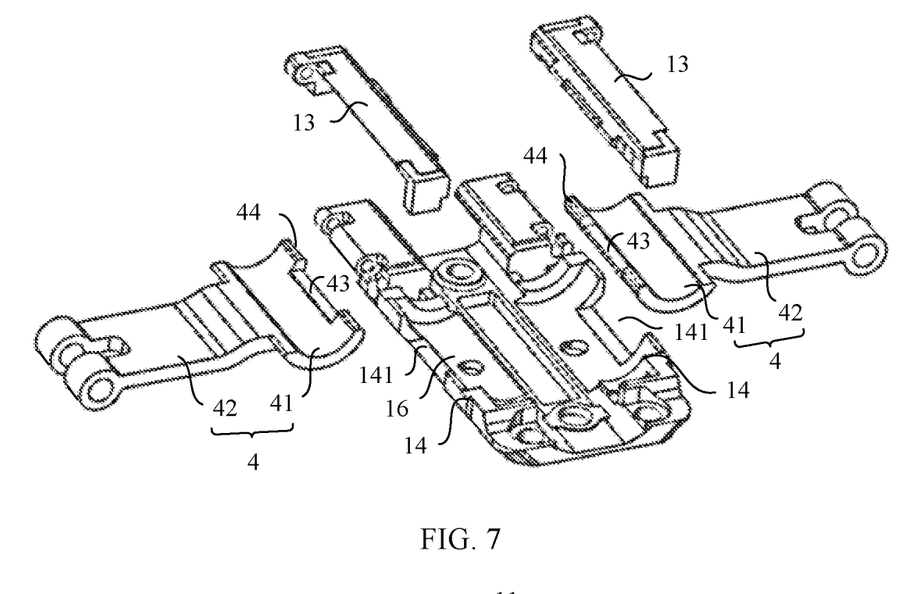
FIG. 7 is an exploded view of a sliding part and a main swing arm.

To ensure that the fitting segment 41 of the main swing arm 4 can slide smoothly along the arc-shaped slide 15, there is a relatively high requirement on accuracy of fitting dimensions of the arc-shaped slide 15 and the fitting segment 41. As shown in FIG. 7, in this embodiment, each upper bracket 13 is an independent structure. During assembly of a sliding part 12, the fitting segment 41 is first placed on an arc-shaped surface 16 of the lower bracket 14, then the upper bracket 13 is placed on top of the lower bracket 14, and an arc-shaped surface 16 of the upper bracket 13 is bonded to top of the fitting segment 41. After a position is adjusted, the upper bracket 13 and the lower bracket 14 are fastened, that is, during installation, each upper bracket 13 is separately installed and adjusted. Specifically, during installation, it is not necessary to consider installation adjustment of other upper brackets 13, provided that accuracy of dimensions of the arc-shaped slide 15 formed between the upper bracket 13 that is being installed and the lower bracket 14 meets requirements. Therefore, compared with a solution in which two upper brackets 13 are disposed as an integrated structure and are assembled at the same time, this can ensure installation accuracy of each arc-shaped slide 15, and can effectively reduce adjustment time and improve installation efficiency.

In this embodiment, the two lower brackets 14 are an integrated structure. Specifically, the two lower brackets 14 are formed in one bracket holder, and the bracket holder is fastened to the rotating shaft part 1. During installation, the lower bracket 14 is fastened to another structure of the rotating shaft part 1, and then the upper brackets 13 are installed one by one, so as to ensure accuracy of each arc-shaped slide 15. When the two lower brackets 14 that are correspondingly disposed on two sides of the rotating shaft part 1 are disposed as an integrated structure, an overall structure can be simplified, and an installation operation can be simplified.

Figure 8:
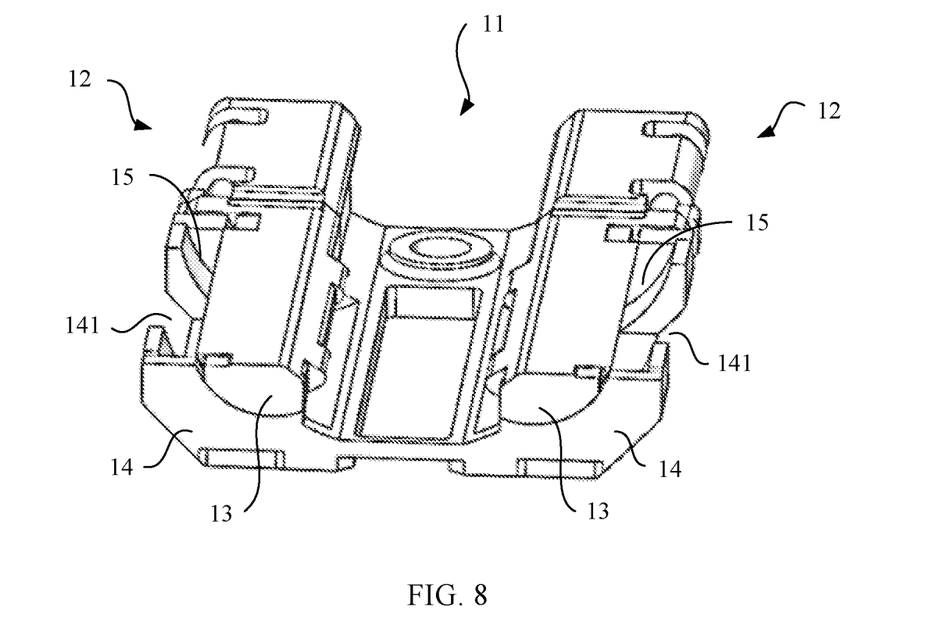
FIG. 8 is a schematic diagram of a structure of a sliding part.
Figure 9:
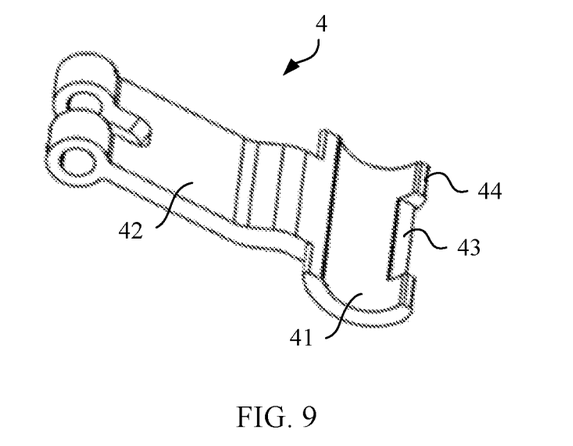
FIG. 9 is a schematic diagram of a structure of a main swing arm.

The groove structure 11 can penetrate through the bracket holder. In addition, as shown in FIG. 8, the arc-shaped slide 15 communicates with the groove structure 11. As shown in FIG. 9, the main swing arm 4 includes a fitting segment 41 and a connection segment 42, one end of the connection segment 42 is connected to the fitting segment 41, and the other end is configured to be connected to the door plate 3. A step is disposed on an end on a side of the fitting segment 41 away from the connection segment 42, and a step surface of the step forms a support structure 43. The fitting segment 41 can slide along the arc-shaped slide 15 until the support structure 43 protrudes from the arc-shaped slide 15 and enters the groove structure 11. As shown in FIG. 6, the support structure 43 can provide support for the floating plate 2 from a lower end face, and as the door plate 3 unfolds, the support structure 43 protrudes from the arc-shaped slide 15 and increases in height. In this case, the support structure 43 can support the floating plate 2 to float up until the door plate 3 is in an unfolded state, the support structure 43 supports the floating plate 2 to stabilize its position, and the upper end face of the door plate 3 and the upper end face of the floating plate 2 are aligned and flat.

As shown in FIG. 9, the step surface is further provided with a support protrusion 44, and the floating plate 2 is correspondingly provided with a groove or a socket that matches the support protrusion 44. When the step surface is supported on a lower end face of the floating plate 2, the support protrusion 44 is located in the groove or the socket. In this way, it can be ensured that in an unfolded state, the step surface can be supported on the floating plate 2, so that the upper end face of the floating plate 2 and the upper end face of the door plate 3 are aligned. Disposing the support protrusion 44 can ensure an overall length of the fitting segment 41, so that in a folded state, the support protrusion 44 is located in the arc-shaped slide 15, which can avoid that the fitting segment 41 is separated from the arc-shaped slide 15.

In this embodiment, specific structures of the step surface and the support protrusion 44 are not limited. As shown in FIG. 9, the structure may be a "concave" shape structure that is high at both ends and low in the middle processed and formed at an end of the fitting segment 41, may be a "convex" shape structure that is low at both ends and high in the middle processed and formed at an end of the fitting segment 41, or may be a high and a low structure. A high position forms the support protrusion 44, and a low position forms the step surface (that is, the support structure 43).

In addition, a spring (not shown in the figure) is disposed in the groove structure 11, and the spring can act on the floating plate 2, so that the floating plate 2 has a tendency of moving into the groove structure 11. That is, the spring can act on the floating plate 2, so that the floating plate 2 floats downward relative to the rotating shaft part 1. Specifically, the spring may be disposed between the lower end face of the floating plate 2 and a bottom wall of the groove structure 11. During folding, the door plate 3 drives the fitting segment 41 to move outward along the arc-shaped slide 15. In this case, the support structure 43 gradually decreases in height and enters the arc-shaped slide 15, and support action of the support structure 43 on the floating plate 2 is removed. The floating plate 2 floats downward under the action of the spring and enters the groove structure 11.

The door plate 3 is further provided with an auxiliary swing arm (not shown in the figure), and the main swing arm 4 and the auxiliary swing arm are respectively connected between the door plate 3 and the rotating shaft part 1. The main swing arm 4 can rotate around the rotating shaft part 1, so as to implement rotation of the door plate 3 around the rotating shaft part 1, and the auxiliary swing arm can implement a guide connection function between the door plate 3 and the rotating shaft part 1. In this embodiment, the floating plate 2 may further be supported by using the auxiliary swing arm, where the auxiliary swing arm is connected to the door plate 3, and in a process in which the door plate 3 rotates around the rotating shaft part 1, the auxiliary swing arm and the lower end face of the floating plate 2 are driven to function, so that the floating plate 2 can float up and down relative to the rotating shaft part 1; or the main swing arm 4 and the auxiliary swing arm may simultaneously provide support for the floating plate 2. This is not specifically limited herein.

That is, floating of the floating plate 2 relative to the rotating shaft part 1 may be mechanically controlled by the support structure 43 of the main swing arm 4 and/or the auxiliary swing arm and the spring, and performance is stable, so as to ensure that in an unfolded state, the upper end face of the floating plate 2 and the upper end face of the door plate 3 can be aligned, and in a folded state, the floating plate 2 can at least partially enter the groove structure 11.

As shown in FIG. 6 to FIG. 8, an upper end of the lower bracket 14 is further provided with a limiting groove 141. In an unfolded state, the support structure 43 of the fitting segment 41 protrudes from the arc-shaped slide 15 and enters the groove structure 11, the support structure 43 is supported on the lower end face of the floating plate 2, and a part of the fitting segment 41 facing to a side of the connection segment 42 is located in the arc-shaped slide 15. The connection segment 42 is located in the limiting groove 141 and abuts against a bottom of the limiting groove 141, and disposing the limiting groove 141 can avoid interference between the lower bracket 14 and the connecting section 42 in the unfolded state, to ensure that the door plate 3 is in the unfolded state. In addition, the bottom of the limiting groove 141 can further limit sliding of the fitting segment 41 in the arc-shaped slide 15. When the door plate 3 drives the main swing arm 4 to rotate, the fitting segment 41 slides along the arc-shaped slide 15 to the connection segment 42 and abuts against the bottom of the limiting groove 141. In this case, it indicates the fitting segment 41 has slid in place, and the upper end face of the door plate 3 and the upper end face of the floating plate 2 are aligned.

Figure 10:
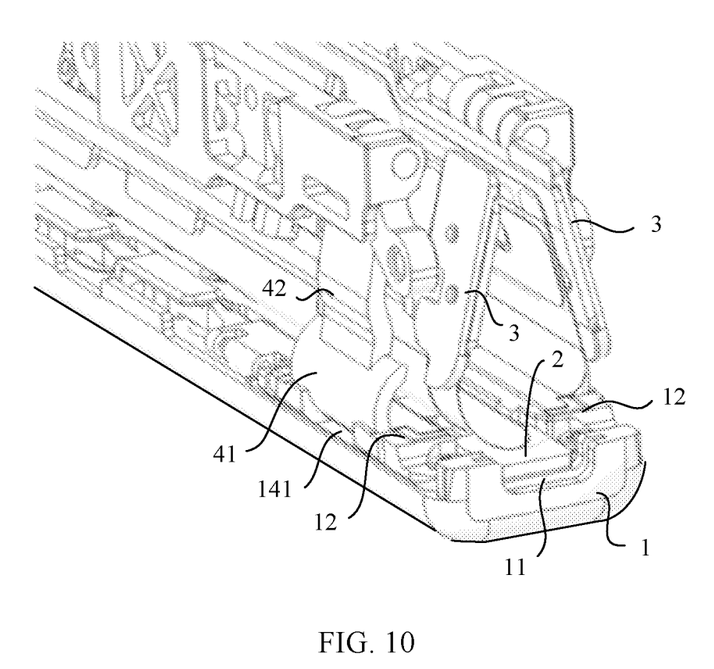
FIG. 10 is a partially enlarged view of a foldable assembly in a folded state.

In an unfolded state, the fitting segment 41 is located in the arc-shaped slide 15. The two door plates 3 rotate and move closer to each other during folding, and drive a corresponding main swing arm 4 to make the fitting segment 41 slide outward along the arc-shaped slide 15 until a folded state. As shown in FIG. 10, the fitting segment 41 mostly slides outside the arc-shaped slide 15, and only the support protrusion 44 at an end of the fitting segment 41 is located in the arc-shaped slide 15. In this case, one end of the fitting segment 41 away from the arc-shaped slide 15 is located above the sliding part 12; the fitting segments 41 of the main swing arms 4 of the two door plates 3 are disposed opposite to each other, that is, two arc-shaped openings of the fitting segment 41 are opposite; and a distance between top ends (that is, an end away from the rotating shaft part 1) of the two door plates 3 is less than a distance between two bottom ends (an end facing the rotating shaft part 1) of the two door plates 3, which is arranged in an approximately splay-shaped structure. In this case, the two door plates 3, the rotating shaft part 1, the floating plate 2, and the fitting segment 41 can be enclosed to form an accommodating space. After the flexible display 200 is folded, a folding part of the flexible display 200 is located in the accommodating space, and is in a waterdrop-shaped structure.

Figure 11:
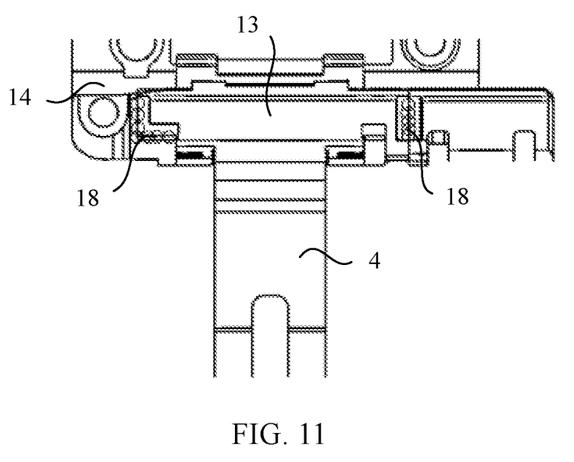
FIG. 11 is a schematic diagram of a welding area between an upper bracket and a lower bracket from a top view angle.

A manner of fixing the upper bracket 13 and the lower bracket 14 is not limited. In this embodiment, the upper bracket 13 and the lower bracket 14 are fastened through welding, and specifically, the upper bracket 13 and the lower bracket 14 are fastened by spot welding. During installation, after a relative position between the upper bracket 13 and the lower bracket 14 is adjusted, spot welding can be performed at a joint between the upper bracket 13 and the lower bracket 14, and a specific welding area 18 is shown in FIG. 11. Certainly, the upper bracket 13 and the lower bracket 14 may also be fastened by using a fastener, and a quantity of components and parts can be reduced through welding, so as to simplify an operation.

The upper bracket 13 is further provided with a positioning hole, and the lower bracket 14 is correspondingly provided with a positioning protrusion 17; or the upper bracket 13 is provided with a positioning protrusion 17, and the lower bracket 14 is correspondingly provided with a positioning hole. The positioning protrusion 17 and the positioning hole can be used to determine an installation position of the upper bracket 13, so that an operator can quickly determine an installation position of the upper bracket 13, to improve installation efficiency. Specifically, during installation, an arc-shaped surface 16 of the upper bracket 13 is buckled with the fitting segment 41, and the positioning protrusion 17 passes through the positioning hole to adjust a size of the arc-shaped slide 15, so that the arc-shaped slide 15 can be fastened through welding after meeting a requirement.

Further, the positioning hole is a through hole, and certainly the positioning hole may also be a blind hole (which is equivalent to a positioning groove). Disposing the through hole makes it is convenient to observe fitting between the positioning protrusion 17 and the positioning hole in an installation process. For example, when the upper bracket 13 is provided with the positioning hole, the lower bracket 14 is provided with the positioning protrusion 17, and when the upper bracket 13 is installed, a position of the lower bracket 14 is not moved. After the arc-shaped surface 16 of the upper bracket 13 is buckled with the fitting segment 41, the positioning protrusion 17 is observed and located by using the positioning hole, and the upper bracket 13 is moved, so that the positioning protrusion 17 can fit with the positioning hole, thereby facilitating an installation operation and improving installation efficiency.

Figure 12:
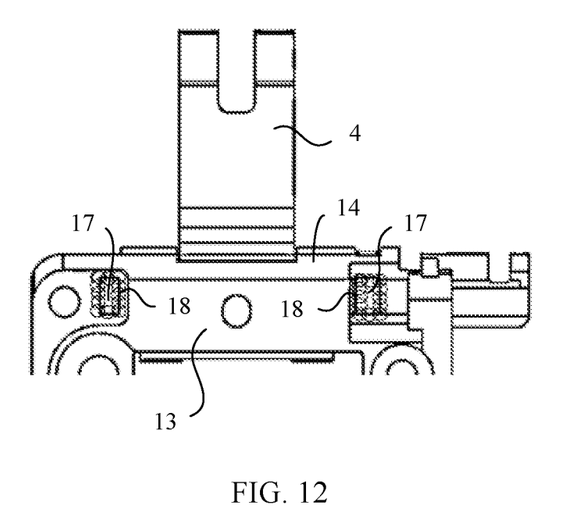
FIG. 12 is a schematic diagram of a welding area between an upper bracket and a lower bracket from a bottom view angle.

In this embodiment, an end of the positioning protrusion 17 can pass through a positioning hole, then a welding operation is performed along a circumferential direction on an end of the positioning hole and the end of the positioning protrusion 17, and a welding area 18 is shown in FIG. 12. That is, a height of the positioning protrusion 17 is approximately the same as an axial length of the positioning hole. After the positioning protrusion 17 passes through the positioning hole, and determines the relative position of the upper bracket 13 and the lower bracket 14, the end of the positioning protrusion 17 and the end of the positioning hole are fastened, through welding, in a circumferential direction, and then a welding operation is further performed between the upper bracket 13 and the lower bracket 14 according to the welding area 18 shown in FIG. 11. In this way, fastening points between the upper bracket 13 and the lower bracket 14 can be increased, and stability of fastening between the upper bracket 13 and the lower bracket 14 is further ensured.

The principle and implementations of this application are described herein based on specific examples. The descriptions about the embodiments are merely intended to help understand the method and the core concept of this application. It should be noted that a person of ordinary skill in the art may make several improvements or modifications without departing from the principle of this application, and these improvements or modifications shall fall within the protection scope of this application.

What is claimed is:

1. An electronic device, comprising:
   a foldable assembly, the foldable assembly comprising:
      a rotating shaft, wherein two sides of the rotating shaft respectively comprise a sliding part, an arc-shaped slide is formed in each sliding part, a groove extends in one side of the rotating shaft, and each arc-shaped slide communicates with the groove;
      two door plates, wherein the two door plates are configured to rotate around the rotating shaft, and to drive a flexible display to fold and unfold;
      two main swing arms, wherein each of the two main swing arms is connected between a corresponding door plate and the rotating shaft, each main swing arm comprises a fitting segment that matches the corresponding arc-shaped slide, and each door plate is configured to rotate around the rotating shaft and drive the corresponding fitting segment to slide along the corresponding arc-shaped slide; and
      a floating plate disposed between the two door plates;
   wherein an end of each fitting segment comprises a support structure, each fitting segment is configured to slide along the corresponding arc-shaped slide until the corresponding support structure protrudes from the corresponding arc-shaped slide and enters the groove, and each support structure is configured to be supported on a lower end face of the floating plate, to support the floating plate to float upwards.

2. The electronic device according to claim 1, wherein a step surface is disposed on each fitting segment, and each step surface forms the corresponding support structure.

3. The electronic device according to claim 2, wherein each step surface comprises a support protrusion, the floating plate correspondingly comprises a groove or a socket that matches each support protrusion, and when a respective step surface is supported on the lower end face of the floating plate, the support protrusion of the respective step surface is located in the groove or the socket.

4. The electronic device according to claim 2, wherein along an axial direction of a respective arc-shaped slide, two ends of the corresponding step surface are respectively provided with support protrusions.

5. The electronic device according to claim 3, wherein in an unfolded state, a respective fitting segment is located in the corresponding arc-shaped slide, the two door plates rotate and move closer to each other during folding, and drive a corresponding main swing arm to make the corresponding fitting segment slide outward along the corresponding arc-shaped slide until a folded state, the corresponding support protrusion at an end of the respective fitting segment is located in the arc-shaped slide.

6. The electronic device according to claim 1, wherein each fitting segment consists of a part of a cylindrical structure.

7. The electronic device according to claim 1, wherein in an unfolded state, each support structure is configured to push the floating plate up to an upper end face of the floating plate to align with an upper end face of the door plate.

8. The electronic device according to claim 1, further comprises a spring arranged between the floating plate and a bottom wall of the groove; and
   wherein when the foldable assembly rotates from an unfolded state to a folded state, each door plate drives the corresponding fitting segment to slide along the corresponding arc-shaped slide, in a manner that a support action of each support structure on the floating plate is removed, and the floating plate floats downward under the action of the spring and enters the groove.

9. The electronic device according to claim 1, wherein each sliding part includes an upper bracket and a lower bracket, each upper bracket is fastened to the corresponding lower bracket, a lower end face of each upper bracket and an upper end face of each lower bracket comprise arc-shaped surfaces, and each corresponding upper bracket and the lower bracket are configured to be enclosed to form the arc-shaped slides.

10. The electronic device according to claim 9, wherein each sliding part comprises a bracket holder of an integrated structure, each bracket holder is fastened to the rotating shaft, and the lower brackets are respectively formed on two sides of the rotating shaft.

11. The electronic device according to claim 9, wherein each main swing arm further comprises a connection segment, one end of each connection segment is connected to the corresponding fitting segment, and the other end of the connection segment is connected to the corresponding door plate; and
   an upper end of each lower bracket comprises a limiting groove, and in an unfolded state, each connection segment is located in the corresponding limiting groove and abuts against a bottom of the corresponding limiting groove.

12. The electronic device according to claim 9, wherein each upper bracket comprises a positioning hole, each lower bracket comprises a positioning protrusion, and each positioning protrusion is configured to be inserted into the corresponding positioning hole to position the upper bracket and the lower bracket; or
   each upper bracket comprises the corresponding positioning protrusion, each lower bracket comprises the corresponding positioning hole, and the corresponding positioning protrusion is configured to be inserted into the corresponding positioning hole to position the respective upper bracket and the corresponding lower bracket.

13. The electronic device according to claim 1, wherein a length of the floating plate is equal to a length of each door plate in the direction of the length of the rotating shaft; or
   the two ends of the floating plate are respectively aligned with the two ends of the door plate.

14. The electronic device according to claim 3, wherein along a length direction of the rotating shaft, the floating plate comprises a wider section and a narrower section, both ends of the wider section are respectively provided with the narrower section, and on both sides of the floating plate, the narrower section and the wider sections at both ends of the narrower section surround to form the groove or the socket.

15. The electronic device according to claim 1, further comprising an auxiliary swing arm, wherein the auxiliary swing arm is connected between at least one door plate and the rotating shaft, and the auxiliary swing arm is configured to implement a guide connection function between the at least one door plate and the rotating shaft.

16. The electronic device according to claim 15, wherein when the at least one door plate rotates around the rotating shaft, the auxiliary swing arm and the lower end face of the floating plate are driven to function, in a manner that the floating plate floats up and down relative to the rotating shaft.

17. The electronic device according to claim 16, wherein each main swing arm and the auxiliary swing arm simultaneously provide support for the floating plate.

* * * * *